A. LOOMIS.
UNIVERSAL SHAFT COUPLING.
APPLICATION FILED MAR. 7, 1908.
1,178,529.
Patented Apr. 11, 1916.
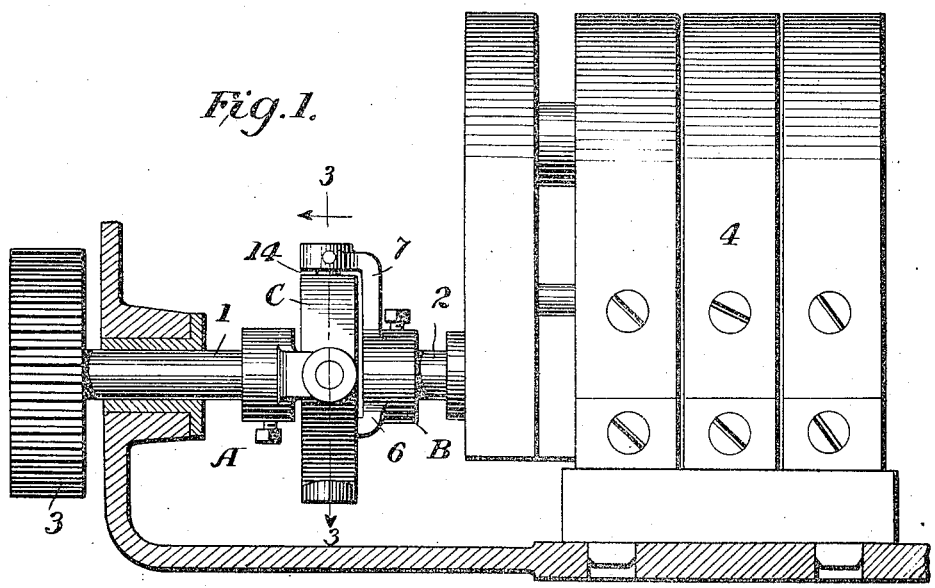
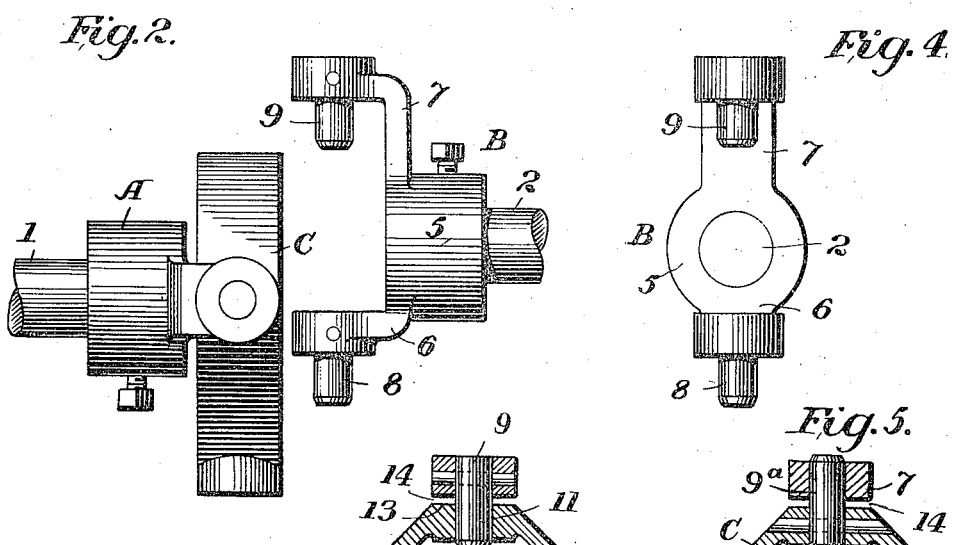
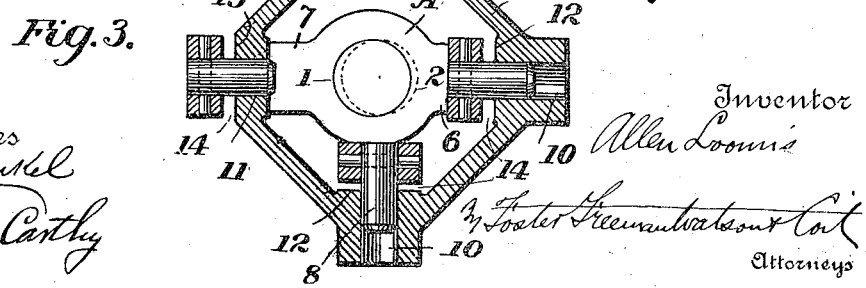
Witnesses
J. G. Hinkel
J. J. McCarthy
Inventor
Allen Loomis
by Foster Freeman Watson & Coit
Attorneys

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

UNIVERSAL SHAFT-COUPLING.

1,178,529. Specification of Letters Patent. Patented Apr. 11, 1916.

Application filed March 7, 1908. Serial No. 419,741.

*To all whom it may concern:*

Be it known that I, ALLEN LOOMIS, a citizen of the United States, residing at Detroit, in the county of Wayne and State of Michigan, have invented certain new and useful Improvements in Universal Shaft-Couplings, of which the following is a specification.

This invention relates to universal joints for shafting such as are adapted to communicate rotary movement from one section of a shaft to another whether the same be in line, or in parallel lines and offset, or at an angle to each other.

The invention is particularly adapted for cases in which it may be desirable to disconnect the shaft sections at the coupling, the present coupling being adapted to be disconnected and reconnected instantly without loosening screws, bolts or other connecting means.

The invention is illustrated in the accompanying drawing, in which,

Figure 1 is a side elevation of two shaft sections connected by my improved coupling, one of the sections being connected with a magneto to illustrate one of the uses of the invention; Fig. 2 is a side view of the coupling, one of the parts being detached; Fig. 3 is a section on the line 3—3 of Fig. 1; Fig. 4 is an end view of the coupling section shown at the right in Fig. 2; Fig. 5 is a detail of a reverse or modified form.

Referring to the drawing, 1, 2, indicate the shaft sections which are to be united by the coupling, section 1 being illustrated as the driving section, having a driving pinion 3 thereon, and the section 2 being illustrated as the driven section and forming the shaft of a magneto 4, such as is used for generating current for the ignition apparatus of a motor vehicle. On the shaft 1 is a coupling section A and on the shaft 2 a similar coupling section B which sections may be identical in construction. The coupling sections A, B, are each pivotally connected with an intermediate section C as will be presently described.

Each of the sections A, B, as illustrated, has a hub 5, a short arm 6 and a longer arm 7. Upon the shorter arm 6 is an outwardly projecting pin or pivot 8 and upon the longer arm 7 is an inwardly projecting pin or pivot 9, which pivots are arranged in a diametrical line passing through the axial line of the shaft section to which the coupling member is connected.

The intermediate coupling member C is in the form of a frame having two pairs of radial openings 10, 11, to receive the pivots 8, 9, of the members A, B. These openings are all radial to a common center and the openings of each pair are in line with each other. The surface of the frame or member C is faced off adjacent to the openings to form bearings for the arms carrying the pivot pins. Thus the inner surface adjacent to the openings 10 is faced off at 12 and the outer surface adjacent to the openings 11 is faced off at 13. The shape of the frame C may be greatly varied, it being simply necessary that it shall be adapted to receive the pivot pins of the shaft members. One of the pivot pins of each of the sections A, B, is made longer than the other to facilitate assembling the coupling, as it is easier to insert one pin at a time than the two simultaneously.

The invention is illustrated as a convenient means of connecting the driving shaft with a magneto shaft to void the necessity of correctly alining the two shafts. As shown in Fig. 3 the driving and driven shafts are offset axially and one of the valuable features of the invention is that it permits of operatively connecting shafts which are so offset though arranged in parallel lines. It is usually a simple matter to arrange shafts in parallel bearings but often difficult to adjust them into coaxial position. By the use of the present invention shafts which are slightly offset axially can be driven, one from the other, as readily as shafts which are truly in line. This results from the freedom with which the members A and B can work radially in the member C. The parts are so proportioned that when assembled the faces 12 and 13 are separated from the adjacent arms of the members A and B by gaps 14 sufficient to permit the required relative radial movement of the members A and B with respect to the member C.

If it be desired to remove the magneto the shaft is turned to the position shown in Fig. 1 and the magneto may then be raised to disconnect the pins from the intermediate member C and then moved to the right, as illustrated in Fig. 2, which will totally disconnect the member B from the member C, leaving the member C upon the member A. By reversing these movements the magneto may be again connected with the driving shaft 1.

It will be evident that the construction of this universal joint may be reversed by connecting the pivot pins to the member C and making pivotal openings in the arms 6 and 7 suitable to receive the pins. This change is illustrated in Fig. 5 which shows one of the arms 7 provided with an eye to receive the pin 9ª carried by the intermediate member C. It will also be evident that one object of my invention, which is to secure the ready connections and disconnection of two shaft members united by a universal joint, may be effected if only one of the members A, B, is readily disconnectible from the intermediate member C. In some instances it may be desirable to permanently connect the members A, C, and simply make the member B disconnectible. For the sake of economy, however, it is preferred to make the members A, B, identical so that they can be cast in the same mold and subjected to the same machine operations. It will also be evident that in so far as the connection of parallel offset shafts is concerned, it is not absolutely necessary that the several parts of the coupling should be readily separable The form of coupling shown in the drawing, however, embodies all of the features of utility referred to and is the preferred embodiment of the invention.

Without limiting myself to the particular construction illustrated and described, I claim, 1. A universal joint comprising two shaft members adapted to be connected with two shaft sections respectively, an intermediate member, and pivotal connections between said shaft members and said intermediate member, a portion of said intermediate member lying between the pivotal portions of one of said shaft members, and the opposite portion of said intermediate member being exterior of said shaft member, whereby the shaft members are adapted to be disconnected from the intermediate member by being moved transversely of their axes.

2. A universal joint comprising two shaft members adapted to be connected with two shaft sections, respectively, and an intermediate member, said shaft members each having radially projecting arms, provided with separate radially-arranged pivots connecting said arms and said intermediate member, one of the arms of one shaft member being arranged interiorly of said intermediate member and the other of said arms being arranged exteriorly of said intermediate member, whereby said shaft member may be disconnected from the intermediate member by a lateral movement in the direction of the axes of its pivots and without removing the pivots from the arms.

3. A universal joint comprising two shaft members adapted to be connected with two shaft sections respectively, and an intermediate member, said shaft members each having radially projecting arms, provided with separate radially-arranged pivots connecting said arms and said intermediate member, one of the arms of each of said shaft members being arranged interiorly of said intermediate member and the other of said arms being arranged exteriorly of said intermediate member, whereby either of said shaft members may be disconnected from the intermediate member by a lateral movement in the direction of the axes of its pivots and without removing the pivots from the arms.

4. A universal shaft coupling comprising two shaft members and an intermediate member to which said shaft members are pivotally connected, one of said shaft members having a short arm extending into the intermediate member and a long arm bearing upon the outer surface of the intermediate member, and pivot pins connecting the intermediate member and said arms and extending in the same direction from their support, whereby the parts may be separated by a radial movement.

5. A universal shaft coupling comprising two shaft members, each provided with a short arm and a long arm, and an intermediate member, the short arms of the shaft members extending into the intermediate member and the longer arms coöperating with the outer surface of the intermediate member, and separate pivot pins connecting the said arms with said intermediate member, whereby either of the shaft members may be disconnected from the intermediate member by a lateral movement in the direction of the axes of its pivot pins and without removing the pivot pins from the arms.

6. A universal shaft coupling comprising two shaft members each provided with means for connecting it to a shaft section and with a shorter and a longer arm, pivot pins carried by the arms of each shaft section arranged in the same diametrical line and extending in the same direction from said arms, and an intermediate member having four openings to receive said pivot pins, whereby the shaft members are adapted to be moved in the direction of the axes of their pivots and disengaged from said intermediate member.

In testimony whereof I affix my signature in presence of two witnesses.

ALLEN LOOMIS.

Witnesses:
L. C. TENNEY,
C. I. DALE.